(No Model.) 6 Sheets—Sheet 1.

M. C. JOHNSON.
DRILL MAKING MACHINE.

No. 539,945. Patented May 28, 1895.

Fig. 1.

Witnesses:
Joseph Arth. Cantin
Arthur B. Jenkins

Inventor:
Moses C. Johnson
By Simonds, Burdett & Frothingham
Attorneys (No Model.)　　　　　M. C. JOHNSON.　　　6 Sheets—Sheet 4.
DRILL MAKING MACHINE.

No. 539,945.　　　　　　　Patented May 28, 1895.

Witnesses:
Joseph Arthur Cantin
Arthur P. Jenkins

Inventor:
Moses C. Johnson
By Simonds, Burdett & Frothingham
Attorneys (No Model.) 6 Sheets—Sheet 5.

M. C. JOHNSON.
DRILL MAKING MACHINE.

No. 539,945. Patented May 28, 1895.

Witnesses:
Joseph Arthur Cantin.
Arthur B. Jenkins.

Inventor:
Moses C. Johnson
by Simonds, Burdett & Frothingham
Attorneys (No Model.) 6 Sheets—Sheet 6.

M. C. JOHNSON.
DRILL MAKING MACHINE.

No. 539,945. Patented May 28, 1895.

Witnesses:
J. A. Cantin
Arthur B. Jenkins

Inventor:
Moses C. Johnson
by Chas. L. Burdett,
Attorney

THE NORRIS PETERS CO., PHOTO-LITHO., WASHINGTON, D. C.

UNITED STATES PATENT OFFICE.

MOSES C. JOHNSON, OF HARTFORD, ASSIGNOR TO THE T. & B. TOOL COMPANY, OF DANBURY, CONNECTICUT.

DRILL-MAKING MACHINE.

SPECIFICATION forming part of Letters Patent No. 539,945, dated May 28, 1895.

Application filed January 23, 1894. Serial No. 497,837. (No model.)

*To all whom it may concern:*

Be it known that I, MOSES C. JOHNSON, of Hartford, in the county of Hartford and State of Connecticut, have invented certain new and useful Improvements in Drill-Making Machines, of which the following is a full, clear, and exact description, whereby any one skilled in the art can make and use the same.

The object of my invention is to provide a machine by means of which an improved twist drill may be manufactured, the machine combining means for producing a twist drill with a groove of any desired pitch and depth, and consequent thickness of web.

To this end my invention consists in the details of the several parts making up the machine as a whole and in the combination of such parts as more particularly hereinafter described and pointed out in the claims.

Referring to the drawings.

It has been determined by thorough test that the greatest advantages, and consequently the least disadvantages, are present in a twist drill having grooves of uniform pitch from point to shank, the groove decreasing in depth and the web consequently increasing in thickness from point to shank, and the within described machine is particularly adapted for producing that form of twist drill.

There is embodied in the machine means for holding the drill blank, for rotating it, and for cutting grooves in diametrically opposite sides of the blank, the cutters during the process of cutting changing their angle of inclination with respect to the axis of the drill blank, which has a lengthwise feeding motion across the cutters. The cutters are arranged on diametrically opposite sides of the blank and are movable directly outward and away from the axis of the drill blank for the purpose of decreasing the depth of the groove and increasing the thickness of the web, the latter being that part of the drill included between the bottom surfaces of the grooves. The mere withdrawal of the mills would decrease the depth of the grooves, but would at the same time decrease the width, and in order to maintain a substantially uniform width of groove from point to shank, which is an important feature, the cutter is caused to change its angular position with reference to the axis of the drill and in this manner maintain the required uniformity of width of groove along its whole length. When the cutter is in contact with the blank in the operation of cutting, a line extended at right angles to the axis of the blank and diametrically through the cutter will represent the axis on which the cutter moves when changing its angular relation to the drill, and it is evident that a pivotal point of support for the cutter in prolongation of this axial line must be provided. One form of providing this change in the angular relation of the cutter with respect to the axis of the drill during the cutting of the grooves is embodied and illustrated in the within application.

In the drawings forming a part hereof the letter A denotes the standard; B, the base of the machine; B′, the side posts; B², the top piece; B³, the cross-piece, and B⁴ the bottom piece.

Near the upper end of the posts B′ is supported a swinging bracket $a$ pivoted to one of the side posts, and on this swinging bracket is supported a fixed stud $a'$ bearing a pulley $a^2$ that is driven by means of a belt from any suitable source of power and by means of which rotary movement is imparted through means of intermeshing gears to the worm shaft $a^3$ bearing a worm in mesh with a worm gear $a^4$. This worm gear $a^4$ is secured to an interior screw threaded sleeve that extends upward and has a bearing in the top piece B², and to the upper end of this sleeve is secured the gear $a^5$ by means of which, through a series of gears of any desired number, movement is imparted to the vertical shaft $a^6$. A bevel gear is also secured to the under side of the worm gear $a^4$ and is in mesh with the bevel gear $a^7$ supported on the shaft bearing the hand wheel $a^8$. The sleeve to which this worm gear $a^4$ is secured, or of which it forms a part, is screw threaded on its interior surface and fits the screw threaded portion $b'$ of the blank holding shaft $b$.

The rotation of the worm gear $a^4$ and consequently the interior screw threaded sleeve, above referred to, imparts to the blank holding shaft $b$ a vertical movement through the medium of the screw threaded part $b'$ of said shaft fitting the interior screw threaded sleeve. The shaft $a^6$ bears on its lower end a bevel gear $a^9$ in mesh with a clutch-shaft driving gear $c'$ secured to the clutch-shaft $c$. This clutch shaft $c$ bears a worm $c^2$ that is in mesh with the worm gear $b^2$ secured to the blank holding shaft $b$. The clutch shaft $c$ has a comparatively slow rotation, and through the medium of worms and gears just described a rotary motion is imparted to the blank holding shaft $b$ and consequently to the blank held therein at its lower end. A more detailed description of this part of the machine has been omitted for the reason that it forms the subject matter of Letters Patent to myself, dated August 25, 1885, No. 324,845, and no claim whatever is made herein to this part of the invention.

The clutch-shaft $c$ is mounted in suitable bearings B⁵ on the side-posts B′. On this shaft $c$ the clutch worms $c^4$ are loosely mounted and the clutch sleeves are splined to the shaft in such manner as to be held against rotation thereon, but to have a free lengthwise movement to enable the teeth thereon to engage the teeth on the clutch worms. There is also secured to these clutch-worms to rotate therewith the equalizing-shaft-driving-gears $c^3$. One end of each of the releasing yokes $d'$ is secured to a clutch-sleeve in such manner as to allow the latter to rotate freely but have no lengthwise movement therein. The other ends of these sleeves are secured to the releasing rods $d$ that are located in casings B⁶ in such manner as to have a free lengthwise movement therein. The equalizing shaft bearings $e^2$ are pivoted upon the releasing rod casings B⁶ or upon the side parts of the frame of the machine in such manner as to have a movement to and from the clutch shaft $c$ and in the outer ends of these equalizing shaft bearings $e^2$ is mounted the equalizing shaft $d^3$ to which are secured the equalizing shaft gears $d^4$ in mesh with the equalizing shaft driving gears $c^3$. On the inner ends of the releasing rods $d$ are pivoted the links $d^5$, the opposite ends of these links being pivoted to the slide $d^6$ located in the slideway on the cross-piece B³. To this slide $d^6$ is also pivoted one end of the slide operating link $d^7$, the opposite end of this link being secured to the slide operating rod $d^8$ that extends through the cross-piece B³ to the front of the machine, the mechanism above described being located on the rear of the machine. To the opposite end of the slide operating rod $d^8$, at the front of the machine is secured the clutch hand lever $d^9$, the inner end of this lever being adapted to engage the latch $d^{11}$ pivoted to the cross-piece B³. The clutch hand lever is provided on its upper side with a cam extension $d^{10}$ of such length as to constantly engage the latch $d^{11}$ when the hook on the lower end of the latter is forced out of engagement with the clutch hand lever and the latter is forced downward under the impulse of the spring plunger $d^{12}$ located in a socket on the machine, a spring tending to force the plunger normally downward. This spring plunger operates to force the slide $d^6$ downward upon the release of the clutch hand lever from engagement with the latch as by raising the outer end of the latter the clutch parts are held out of engagement when the slide $d^6$ is at the upper limit of its play the central pivot of the links being located either in alignment with the axes of the releasing rods $d$ or at a point above that line.

It is obvious that the cutter heads K, hereinafter referred to, bearing the cutters should be maintained in the same relative position and lifted or depressed simultaneously in order to enable a drill blank to be equally cut on each side, and the object of the construction of the equalizing shaft above described is to enable this result to be attained. This equalizing shaft $d^3$ connects the clutch worms $c^4$ through the medium of the gears $c^3$ compelling both clutch worms to turn together, these clutch worms being in engagement with the elevating shafts E that lift or depress the cutter heads K. If the clutch worms $c^4$ were not thus connected, when the clutch parts are thrown out of engagement the clutch worms would be loose on the shaft and a jar or other cause would be liable to rotate the same throwing the cutter head connected thereto out of its relative position with the opposite cutter head, and the construction above described obviates such a fault.

Bearings $B^7$ for the elevating shafts are secured to the side parts $B'$ and in these bearings are journaled the upper sections $e$ of the elevating shafts E. Secured to these upper sections $e$ are worm gears $e'$ in mesh with the worms $c^4$ on the clutch shaft $c$. The extensible sections $e^{21}$ of the elevating shafts E are secured to the upper sections by means of a ball and socket joint, the lower half of the extensible section being splined within the upper half in such manner as to compel the two sections to rotate together but to have a sliding movement one within the other, the lower end of the extensible section $e^{21}$ being secured to the elevating worm shafts $e^3$ by means of a ball and socket joint, as above described. These elevating worm shafts bear elevating worms $e^4$, in mesh with a segmental gear $k^6$, located on the elevating head hereinafter described.

On the top slides $f$ are located the bearings $f'$ for the elevating worm shafts $e^3$, and there are also secured to said top slides, preferably integral therewith, the head supports $f^2$. The top slides $f$ are adjustably secured to the intermediate slides by means of bolts passing through slotted openings $f^3$ in the top slides, the top slides being adjustable on the intermediate slides in a line lengthwise of the cutter spindle. Each intermediate slide $g$ has a dove-tailed projection on its under side adapted to fit a dove-tailed groove in the upper part of the bottom slides $h$. These bottom slides have also located on their under sides dove-tailed grooves adapted to receive the dove-tailed projection on the upper side of the slide bases, the latter being secured to the base B. The bottom slides are movable on the slide bases laterally of the machine, and the intermediate slides are movable on the bottom slides also laterally of the machine, the several slides being provided with intermeshing screws and nuts for securing any desired degree of movement one upon the other, and the adjacent surfaces of the moving parts are provided with graduations whereby fine adjustments of the slides one upon the other may be secured.

Figures 5, 6, 7, 8:
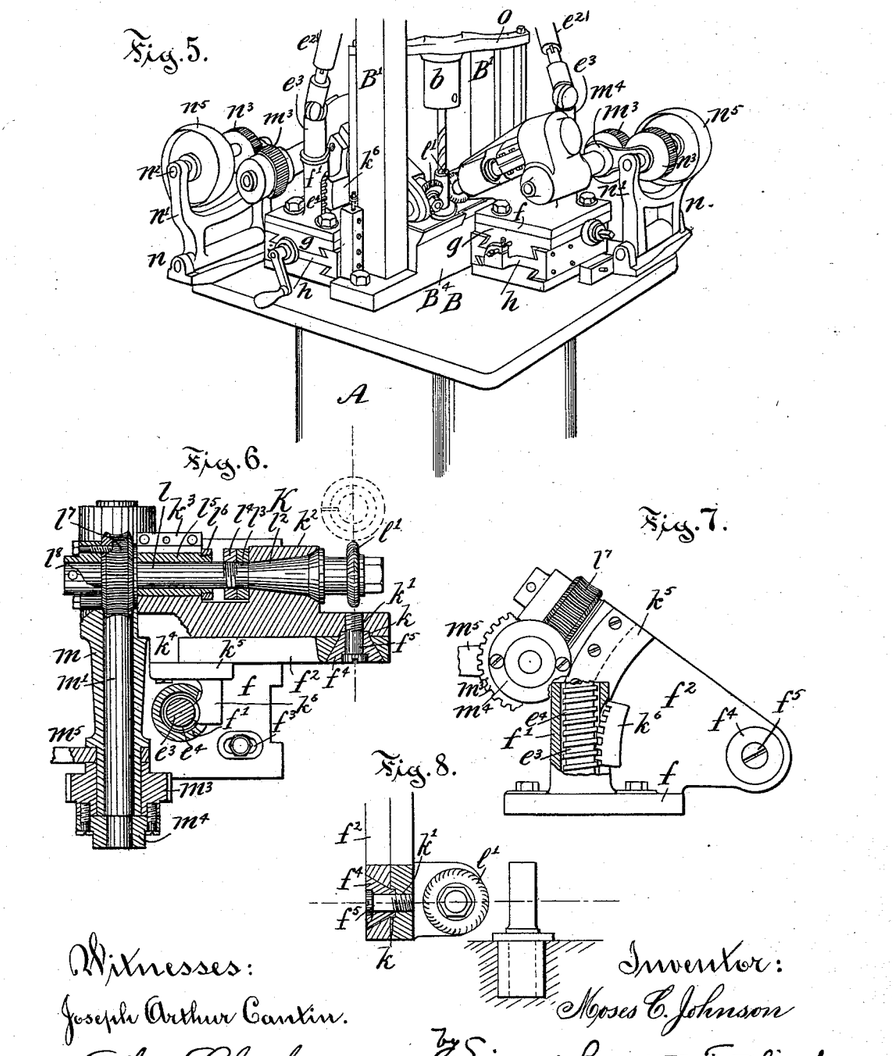
Fig. 5 is a perspective view of the lower part of the machine.
Fig. 6 is a detail top view in section through the cutter-head in the axis of the driving-worm shaft and of the cutter-spindle, showing the manner of pivoting said cutter-head to the top slide and the relation of the cutter and pivot.
Fig. 7 is a detail end view of the top slide and cutter-head, showing the means for giving vertical movement to the latter.
Fig. 8 is a detail front view in section through the pivot of the cutter-head, showing the relation of the cutter to said pivot.
Figure 11:
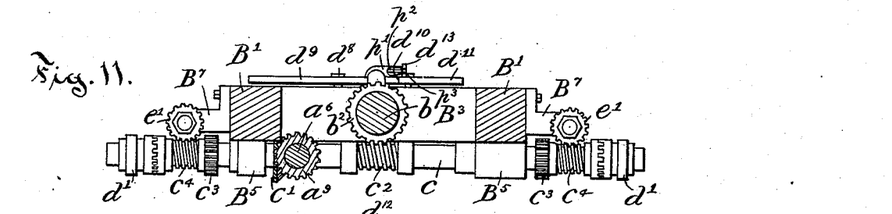
Fig. 11 is a view in horizontal section through the machine on a line just above the clutch-shaft, looking down.
Figure 12:
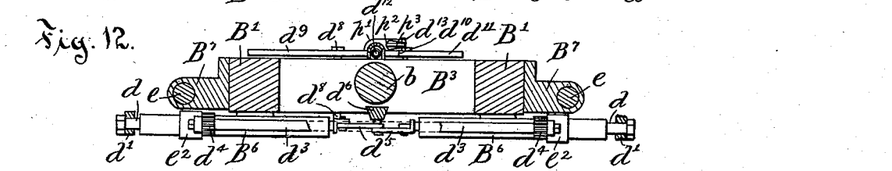
Fig. 12 is a like view on a line between the clutch-shaft and equalizing-shaft and immediately above the latter.
Figure 13:
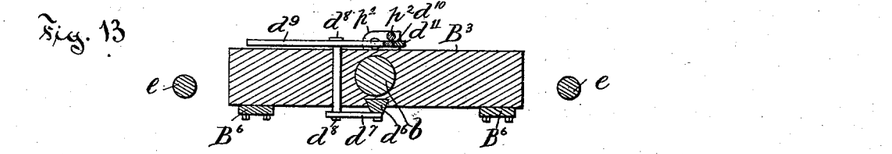
Fig. 13 is a like view on a line just underneath the casings for the releasing-rods.
Figure 14:
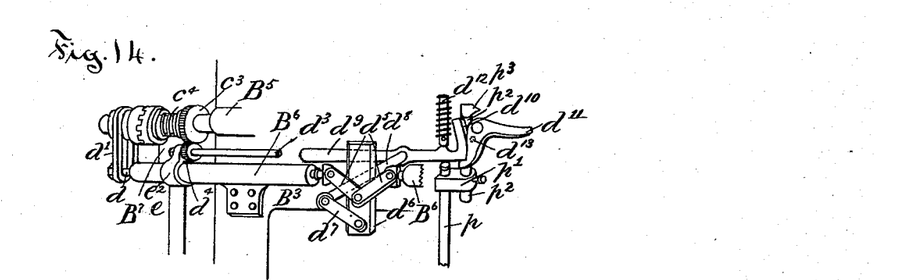
Fig. 14 is a diagram view in perspective, showing the connections between the several parts composing the clutch-shaft-operating mechanism and their relative relation to each other and to the clutch-shaft.

In the head supports $f^2$ are bevel openings within which are located the cutter head joints $f^4$ extending beyond the surface of the head supports and provided with central holes for the reception of the retaining screws $f^5$. The cutter heads K have on their inner ends sockets $k$ within which fits one end of the cutter head joints $f^4$, and centrally of this socket $k$ is the screw threaded opening $k'$ for the reception of the retaining screws $f^5$, this construction of the joints affording a means of securing the parts together that prevents any rocking or sidewise movement whatever of the one part upon the other. These cutterheads K are provided with projections or bearings $k^2$, $k^3$, for the cutter spindles $l$. These cutter spindles $l$ are provided on their lower ends with any suitable means of attachment thereto of the cutters $l'$, preferably being screw threaded, and the cutters are secured to the spindles by means of nuts fitting the ends of the spindles. Each cutter spindle has a bevel portion $l^2$ fitting within the bevel socket in the cutter bearing $k^2$, and on the upper side of this bearing $k^2$ and secured to the spindle as by a key is a collar $l^3$, and on a threaded portion of the spindle adjacent to this collar a lock nut $l^4$. In the bearings $k^3$ are sleeves $l^5$, the lower ends of which are screw threaded and bear nuts $l^6$, these several collars and nuts just described affording a means of taking up any wear and preventing the spindle from any lateral or longitudinal movement within the bearings. To the cutter spindle $l$ is secured the worm gear $l^7$, the spindle drivers $l^8$ fitting upon the end of the spindle $l$ and being secured to the worm gear as by means of screws passing through the spindle-drivers into the worm gears, the spindle drivers being secured to the spindles as by means of pins passing through and through the several parts. On the upper ends of the cutter heads are located the spindle driving shaft bearings $m$ within which are journaled the spindle driving shafts $m'$ bearing on their outer ends the spindle driving worms $m^2$. On the opposite end of each spindle driving shaft is borne the driving gear $m^3$ secured to the driving collar $m^4$ fitting over the end of the driving shaft and secured to the gear as by means of screws passing through the former into the latter, the collar in turn being secured to the driving shaft by means of a key or of a pin passing through the parts.

On the base B are secured swinging frame bases $n$ within which are pivoted the swinging frames $n'$, the upper ends of the swinging frames branching outward and forming bearings for the driving shafts $n^2$. On these driving shafts $n^2$ are secured the driving gears $n^3$ in mesh with the spindle driving gears $m^3$ on the spindle driving shafts $m$. Yokes $m^5$ are secured to the shafts $n^2$ and $m'$ respectively in such manner as to allow the shafts to rotate freely therein, the object of the yokes being to keep the gears $m^3$ and $n^3$ continually in mesh with each other, the swinging frames $n$ allowing the gears to move to or away from the machine as the cutter heads are elevated or depressed. To the driving shafts $n^2$ are secured the pulleys $n^5$ adapted to receive a belt extending from any suitable source of power and furnishing means for driving the cutter spindles and cutters attached thereto.

The front edges of the cutter head supports $f^2$ are formed in the arc of a circle struck from the center of the cutter head joints $f^4$, and a projection $k^4$ extends outward from each of the cutter heads a distance equal to the thickness of the cutter head supports $f^2$, the edge of this projection adjacent to the head supports being formed in the same arc of a circle as the edge of said head support. Elevating head gibs $k^5$ are secured to the projections $k^4$ in such manner as to extend some distance inward along the head supports $f^2$ on the side opposite from the body of the cutter heads K.

Figure 1:
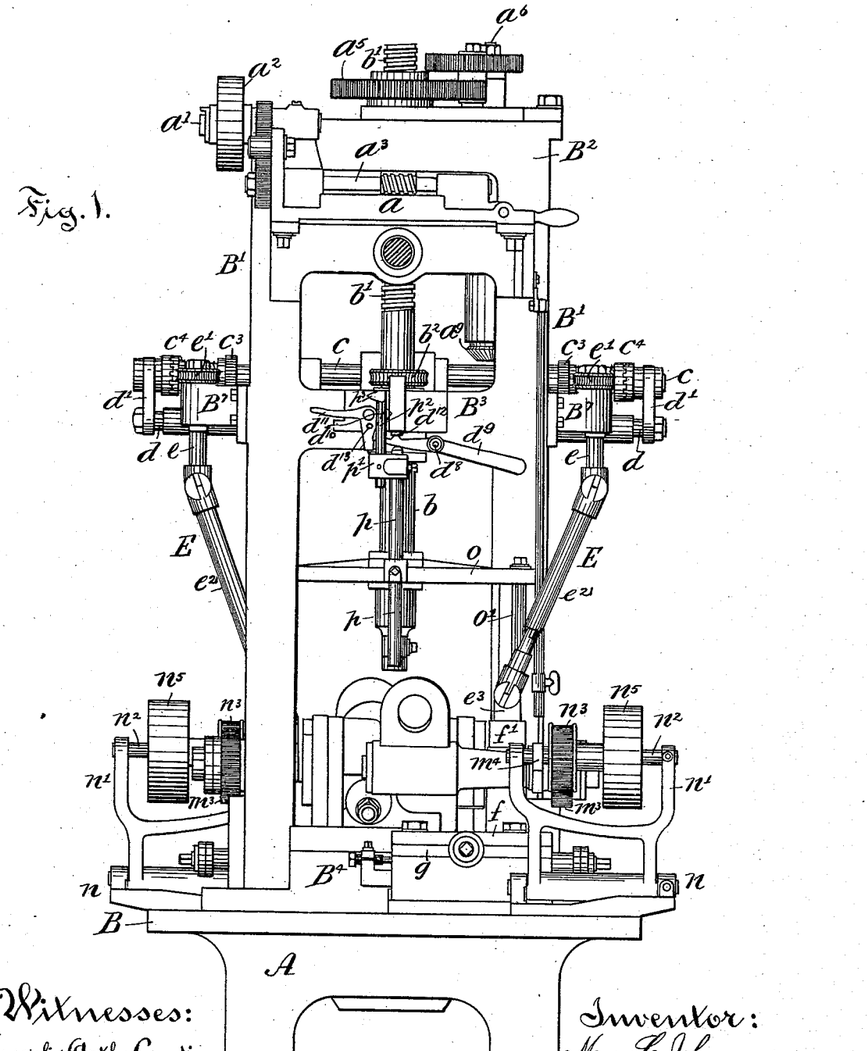
Figure 1 is a view in front elevation of my improved machine, with the hand-wheel shaft cut in section.
Figure 2:
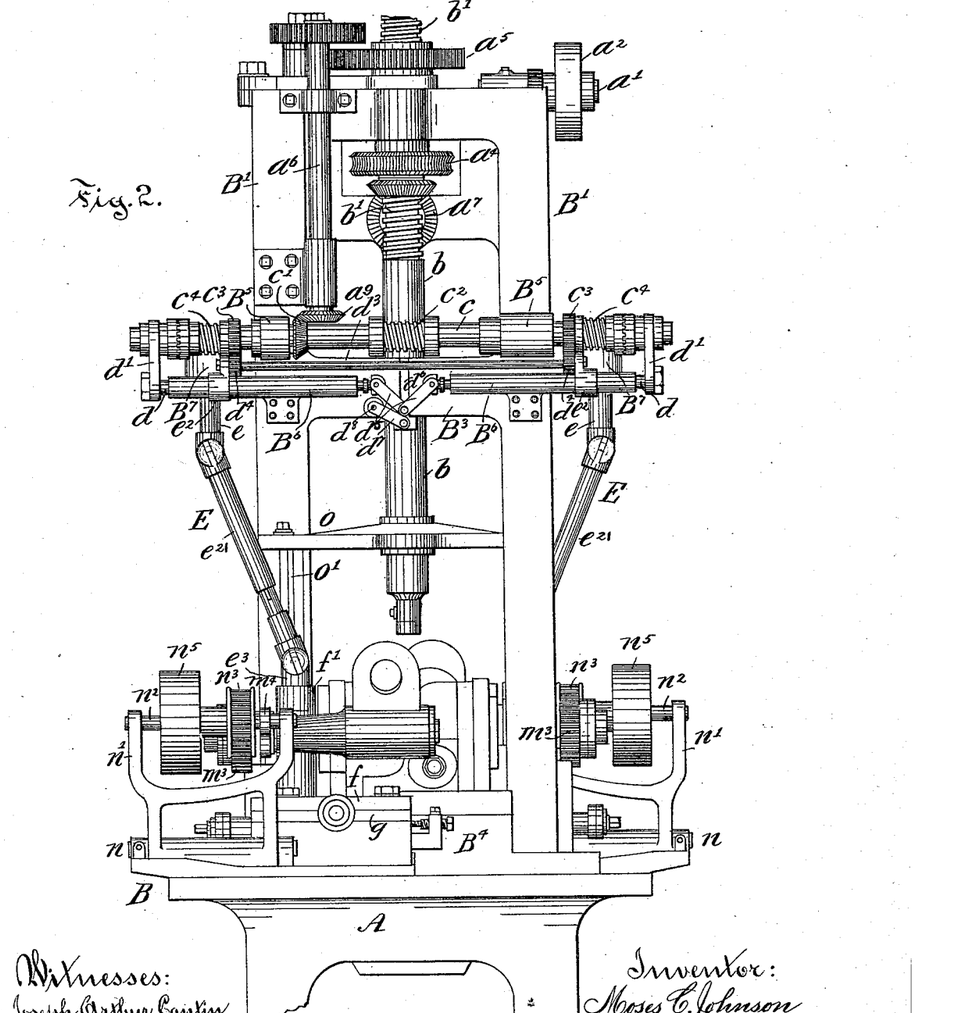
Fig. 2 is a view in rear elevation of the machine.
Figure 3:
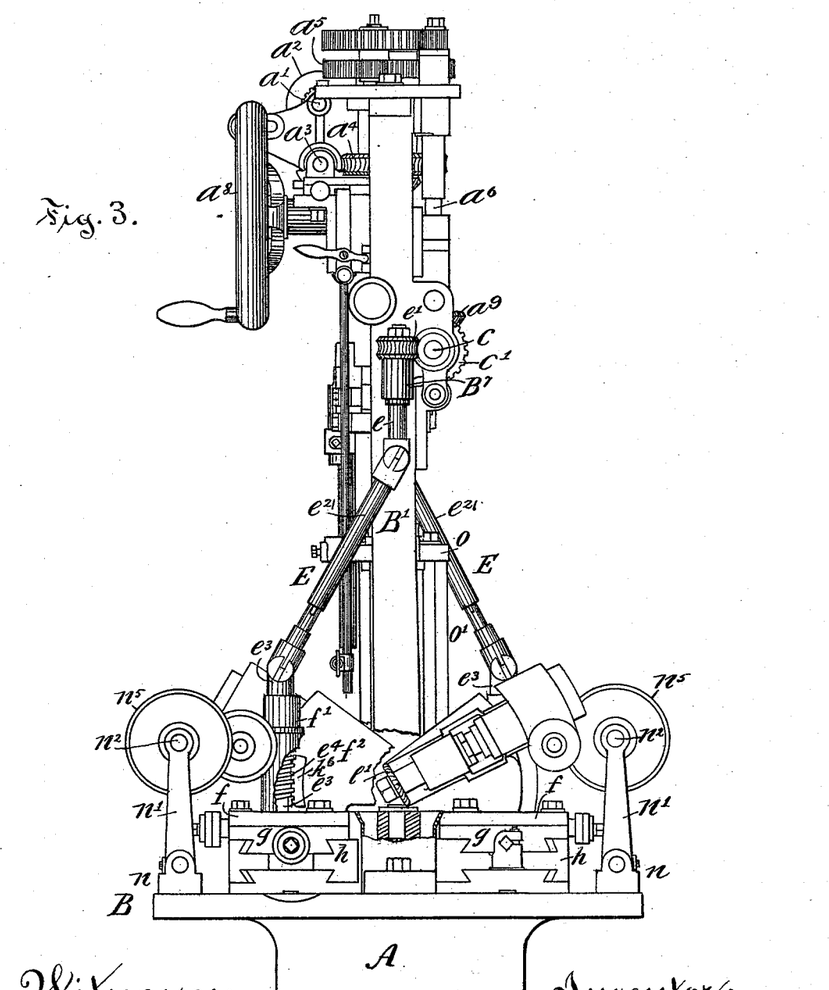
Fig. 3 is a view in side elevation of the machine with parts broken away to show construction.
Figures 4, 9, 10:
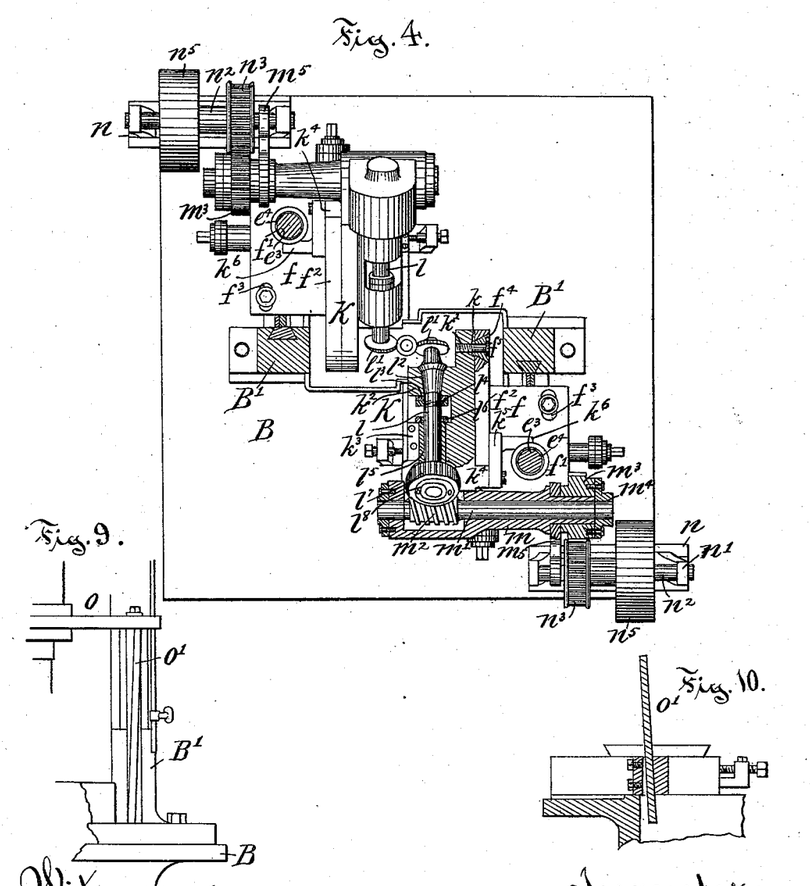
Fig. 4 is a top or plan view of the machine, one side being cut in section through the axis of the driving-worm shaft and of the cutter-spindle.
Fig. 9 is a detail front view of the web-slides for varying the distance between the cutters.
Fig. 10 is a detail view in section through one of the web-slides, showing its contact with the cutter-head slide.

The web yoke $o$ is secured to the blank holding shaft $b$ and its opposite ends extend on opposite sides of the posts B'. Web slides $o'$ project downward from each end of said web yokes through openings in the top slides $f$, these web slides having their upper ends inclined outward to give to the top slides $f$ a movement away from and toward the blank feeding shaft as the web yoke $o$ moves downward and upward. A vertical shipping rod is also secured to one end of the web yoke and extends upward to engage the swinging bracket $a$ to throw the mechanism thereon out of engagement with the other parts of the machine and stop its operation at predetermined positions of the web yoke $o$. A fuller description of this web yoke, web slides and shipping rod will be found in my patent hereinbefore mentioned.

A clutch disengaging rod $p$ is adjustably secured in a socket in the front of the web yoke $o$, the upper end of this rod having adjustably secured thereto the engaging and disengaging rod yoke $p'$, and to this yoke is secured the engaging rod $p^2$ the upper end of which bears a trip $p^3$ adapted to engage a pin $d^{13}$ on the latch $d^{11}$. The clutch disengaging rod $p$ is secured to the web yoke so that its upper end will strike the clutch hand lever $d^9$ at a certain time and throw it upward allowing the latch $d^{11}$ to fall by gravity into engagement therewith and hold it in this position, and the engaging rod is so adjusted as to trip the latch at a certain time and allow the hand lever to fall, the first described movement of the clutch hand lever throwing the clutch parts out of engagement from, and the second described movement throwing them into engagement with, the clutch shaft $c$.

There has been described herein one form of mechanism for accomplishing a movement of the cutters away from the drill blank and at the same time rotating or tipping the cutters on an axis, formed in the line of a diameter thereof, at the same time that the drill blank is fed downward and also rotated, but it is obvious that other mechanisms may be employed for accomplishing the same result without departing from my invention.

An important feature of my invention consists in the combination of mechanisms and means whereby the angular relation of the axis of the drill blank to the plane of the cutter, or to that line which has been described as the circumferential axis of the cutter, may be changed. The result of the change of the angular relation of the plane of the cutter to the axis of the drill blank enables the width of the groove to be maintained as the groove is being cut in the substance of the drill blank, and while the cutters are drawn back to give increased thickness of web.

I claim as my invention—

1. In combination with a blank holding shaft and means for operating the same, a cutter supported in operative relation thereto, means for automatically swinging the cutter on a diametrical axis, and means for automatically rotating the cutter on a circumferential axis simultaneously with its movement on the diametrical axis, all substantially as described.

2. In combination with a blank holding shaft and means for operating the same, cutters supported in operative relation thereto, means for simultaneously rotating the cutters on a circumferential axis, and means for automatically swinging the cutters on a diametrical axis in a line transversely to the axis of the blank holding shaft and simultaneously with their rotation on a circumferential axis, all substantially as described.

3. In combination in a drill making machine, a frame supporting therein a blank holding shaft, means for operating said shaft, a cutter head pivoted transversely of the axis of the blank holding shaft, means for automatically swinging the cutter head on its pivot, the cutter spindle borne in the cutter head, and means for automatically rotating the spindle simultaneously with the swinging movement of the cutter head, all substantially as described.

4. In combination in a drill making machine, a frame supporting therein a blank holding shaft, means for operating said shaft, a cutter head pivoted transversely of the axis of the blank holding shaft, means for automatically swinging the cutter head on its pivot, the cutter spindle borne in the cutter head to swing therewith, the spindle driving shaft borne in a swinging frame and in engagement with the cutter spindle, the swinging frame, and means for rotating the spindle driving shaft simultaneously with the swinging movement of the cutter head, all substantially as described.

5. In combination in a drill making machine, a frame supporting therein a blank holding shaft, means for operating said shaft, a cutter head pivoted transversely of the axis of the blank holding shaft, means for automatically swinging the cutter head on its pivot, the cutter spindle borne in the cutter head to swing therewith, a cross shaft borne on the cutter head in operative engagement with the cutter spindle, the spindle driving shaft borne in a swinging frame and in operative engagement with the cross shaft on the cutter head, the yoke connecting the spindle driving shaft and the shaft on the cutter head, the swinging frame, and means for automatically driving the spindle driving shaft simultaneously with the swinging movement of the cutter head, all substantially as described.

6. In combination in a drill making machine, a frame supporting therein a blank holding shaft, means for operating said shaft, the cutter head supports, the cutter heads pivoted in operative relation to the blank holding shaft and in the cutter head supports, means for swinging the cutter heads on said pivots, the cutter spindles borne in the cutter heads to swing therewith, the spindle driving shafts in operative engagement with the cutter spindles, and means for rotating the driving shafts simultaneously with the swinging movement of the cutter heads, all substantially as described.

7. In combination with the swinging cutter head of a drill making machine, a segmental gear borne on the head, a sectional shaft in operative engagement with the segmental gear, the sections of the shaft turning together but having a sliding movement one within the other, and means for rotating the sectional shaft, all substantially as described.

8. In combination with the swinging cutter head of a drill making machine, a clutch shaft, means for operatively connecting said clutch shaft and head, the clutch devices borne on the shaft, means for engaging and disengaging said clutch devices, and means for rotating said clutch shaft, all substantially as described.

9. In combination with the swinging cutter head of a drill making machine a clutch shaft, means for operatively connecting said clutch shaft and head, the clutch devices borne on the shaft and adapted to operatively engage the clutch shaft and means for automatically engaging and disengaging the clutch devices in the operation of the machine, all substantially as described.

10. In combination with the swinging cutter heads of a drill making machine, the segmental gears borne on the cutter heads, the sectional shafts in operative engagement with the segmental gears, the clutches loosely mounted on the clutch shaft and in operative engagement with the sectional shafts, the clutch sleeves secured to the clutch shaft to rotate therewith but having a longitudinal movement thereon and adapted to engage the clutches, means for moving said clutch sleeves longitudinally on the clutch shaft, the clutch shaft, and means for rotating the same, all substantially as described.

11. In combination with the swinging cutter heads of a drill making machine, segmental gears borne on the cutter heads, the clutch shaft, the clutches loosely mounted on the clutch shaft but adapted to be rotated therewith and connected with the segmental gears, the equalizing shaft in engagement with said clutches, and means for rotating the clutch shaft, all substantially as described.

12. In combination with the swinging cutter heads of a drill making machine, the segmental gears borne on the cutter heads, the sectional shafts in operative engagement with the segmental gears the clutches loosely mounted on the clutch shaft and in operative engagement with the sectional shafts, the clutch sleeves secured to the clutch shaft to rotate therewith but having a longitudinal movement thereon and adapted to engage the clutches, means for moving said clutch sleeves longitudinally on the clutch shaft, the clutch shaft, the swinging bearings pivoted to the clutch shaft, the equalizing shaft borne in the swinging bearings and in engagement with the clutch sleeves whereby simultaneous movement of the latter and consequently of the cutter heads is secured, and means for rotating the clutch shaft, all substantially as described.

13. In combination with the clutch shaft of a drill making machine, the clutches loosely mounted thereon, the clutch sleeves secured to the clutch shaft to rotate therewith but having longitudinal movement thereon, the releasing rods secured to the clutch sleeves and to the slide, the slide, the slide operating rod in engagement with the slide, and the clutch hand lever secured to the rod, all substantially as described.

14. In combination with the clutch shaft of a drill making machine, the clutches loosely mounted thereon, the clutch sleeves secured to the clutch shaft to rotate therewith but having longitudinal movement thereon, the releasing rods in engagement with the clutch sleeves, the links connecting the rods and slide, the slide, and the slide operating rod in engagement with the slide and extending through to the opposite side of the machine and provided with a hand lever, all substantially as described.

15. In combination with the swinging cutter heads of a drill making machine, the clutch shaft and means operatively connecting said shaft with said cutter heads to swing them on their pivots, the clutch devices interposed between the clutch shaft and the swinging cutter heads, and means for automatically engaging and disengaging said clutch devices in the operation of the machine, all substantially as described.

16. In combination with the clutch-shaft of a drill making machine, a clutch loosely mounted on the shaft, a clutch sleeve secured to the shaft to rotate therewith but having a free longitudinal movement thereon and adapted to engage the clutch, the releasing rods in operative engagement with the clutch sleeve, the operating rod in engagement with the releasing rods, mechanism for holding the releasing rods at either limit of their play, and trip devices borne on moving parts of the machine and adapted to engage and disengage the clutch devices, all substantially as described.

17. In combination in a drill making machine, the swinging cutter heads, the clutch shaft and means operatively connecting said shaft with the cutter heads, clutch devices borne on the clutch shaft and adapted to engage and disengage the cutter heads and clutch shaft, the clutch hand lever connected with the clutch devices, the latch adapted to be engaged and disengaged from the hand lever, the web yoke, the clutch disengaging rod adjustably secured to the yoke, and the clutch engaging rod adjustably secured to the disengaging rod and adapted to trip the latch and free it from engagement with the hand lever, all substantially as described.

18. In combination with a clutch shaft of a drill making machine, the clutch devices borne on the clutch shaft and adapted to engage and disengage said shaft from operating parts of the machine, the releasing rods in engagement with the clutch device, the clutch hand lever connected to the releasing rods, the latch adapted to engage and disengage the hand lever, the web yoke, the clutch disengaging rod adjustably secured to the yoke, the engaging and disengaging yoke adjustably secured to the disengaging rod, the engaging rod secured to the engaging and disengaging yoke and provided with a trip adapted to engage the latch to force it out of engagement with the hand lever, and means for rotating the clutch shaft, all substantially as described.

19. In combination in a twist drill cutting machine, a movable blank holding device, a cutter with its periphery supported in operative cutting relation to the path of movement of a drill blank secured in the holder, and means for automatically changing the angular relation of the plane of the cutter and the axis of the drill blank, all substantially as described.

20. In combination in a twist drill cutting machine, a movable blank holding device, a cutter with its periphery adjustably supported in operative cutting relation to the path of movement of the drill blank, and means for automatically changing the angular relation of the plane of the cutter and the axis of the drill blank, all substantially as described.

MOSES C. JOHNSON.

Witnesses:
EDMUND TWEEDY,
CHARLES H. WILCOX, Jr.